INVENTORS
Herbert Green
Richard P. Keck
BY
Shenier & O'Connor
ATTORNEYS

LORAN DETECTOR CIRCUIT

Filed July 27, 1967 2 Sheets-Sheet 2

INVENTORS
Herbert Green
Richard P. Keck
BY
Shenier & O'Connor
ATTORNEYS 3,537,016
LORAN DETECTOR CIRCUIT Herbert Green, Elmsford, N.Y., and Richard P. Keck, Wilton, Conn., assignors to United Aircraft Corporation, East Hartford, Conn., a corporation of Delaware Filed July 27, 1967, Ser. No. 656,383
Int. Cl. H03d 3/18
U.S. Cl. 329—50 8 Claims

ABSTRACT OF THE DISCLOSURE

In general, our invention contemplates the provision of a pair of synchronously actuated reversing switches. An input signal to be detected is coupled through a first reversing switch to a synchronous detector which samples the input wave form for approximately one-half cycle. The output of the synchronous detector is applied to the second reversing switch. By simultaneously actuating the two reversing switches, the polarity of the detected signal appearing at the output of the second switch remains constant. However, off-set errors due to residual voltages in the synchronous detector and to non-linear distortion in the radio-frequency amplifier appear with alternate positive and negative polarity and hence integrate to zero.

SUMMARY OF THE INVENTION

One object of our invention is to provide a synchronous detector circuit in which the input to and the output of the detector are simultaneously reversed in polarity at periodic intervals.

Another object of our invention is to provide a synchronous detector circuit which exhibits no error due to off-set voltages occasioned by either unbalance in the synchronous detector or non-linear distortion in the radio-frequency amplifier.

A further object of our invention is to provide an improved loran detector circuit.

Other and further objects of our invention will appear from the following description.

DESCRIPTION OF THE DRAWINGS

In the accompanying drawings which form part of the instant specification and are to be read in conjunction therewith and in which like reference numerals are used to indicate like parts in the various views.

DESCRIPTION OF THE PREFERRED EMBODIMENTS

Figure 1:
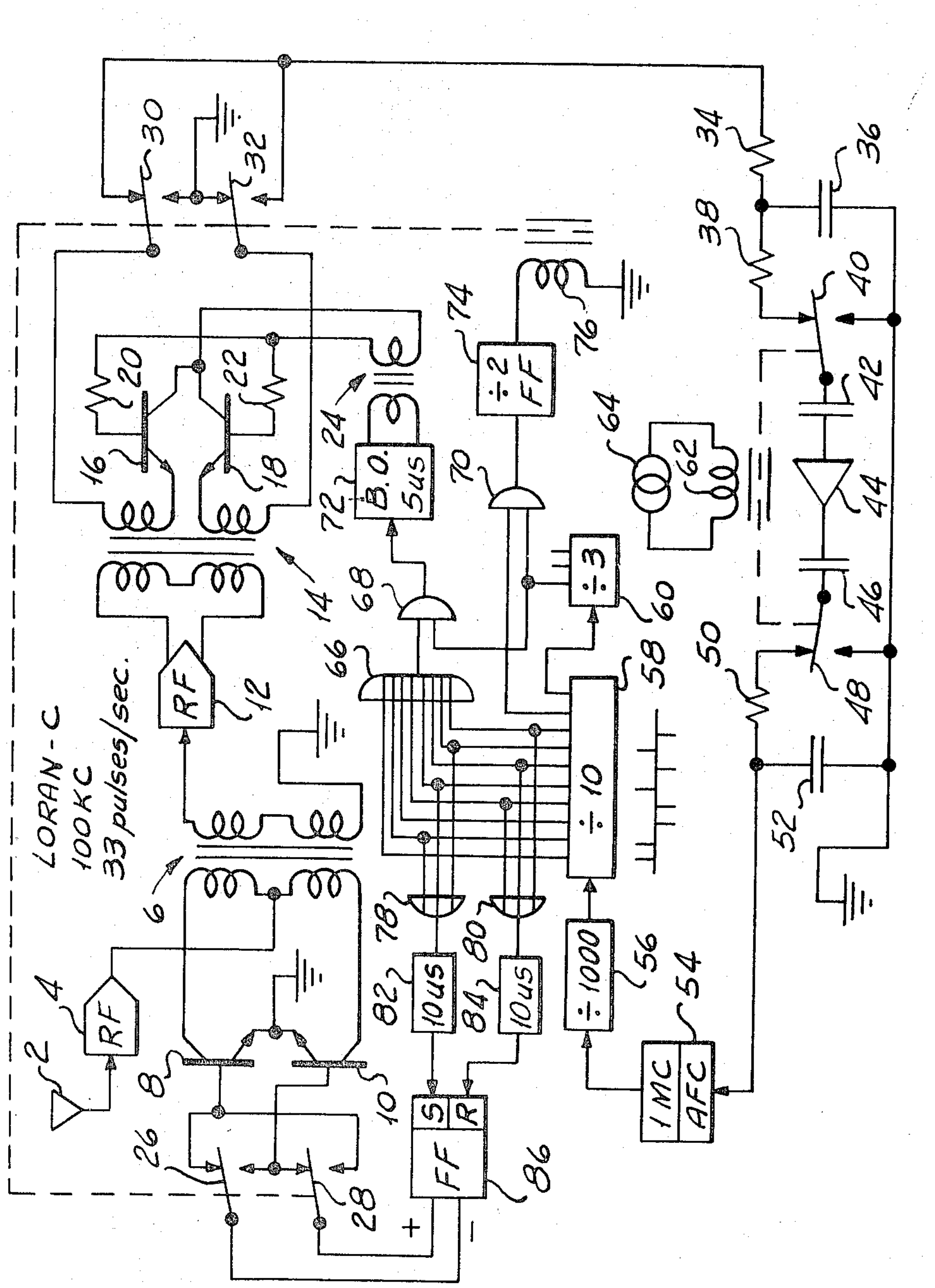
FIG. 1 is a schematic view illustrating one embodiment of our invention.

Referring now to FIG. 1, the output of a receiving antenna 2 is coupled to a low-level radio-frequency amplifier 4 which is tuned to a loran-C frequency of 100 kilocycles. The output of amplifier 4 is connected to the center tap of the primary winding of a transformer 6. The terminals of the primary winding of transformer 6 are coupled to the collectors of respective n-p-n transistors 8 and 10, the emitters of which are grounded. One terminal of the secondary winding of transformer 6 is grounded; and the other terminal thereof is coupled to the input of a high-level radio-frequency amplifier 12 which is similarly tuned to 100 kc. The output of amplifier 12 is connected across the primary winding of a transformer 14 having a pair of similarly secondary windings. One secondary winding of transformer 14 couples the emitter of a transistor 16 to the armature of a switch 30; and the other secondary winding couples the emitter of a transistor 18 to the armature of a switch 32. Switches 30 and 32 comprise a double-pole double-throw reversing switch. One contact of each of switches 30 and 32 is grounded; and the other contacts thereof are connected to a low-pass filter comprising a series resistor 34 and a shunt capacitor 36. The ungrounded terminal of capacitor 36 is connected through a resistor 38 to one contact of a single-pole double-throw chopped switch 40, the other contact of which is grounded. The armature of switch 40 is coupled through a capacitor 42 to an alternating current amplifier 44. The output of amplifier 44 is coupled through a capacitor 46 to the armature of a single-pole double-throw demodulator switch 48. One contact of switch 48 is grounded; and the other contact thereof is connected to a low-pass filter comprising a series resistor 50 and a shunt capacitor 52. The ungrounded terminal of capacitor 52 is applied to the automatic frequency control input of a stable oscillator 54 which provides a frequency of 1 megacycle.

The output of oscillator 54 is coupled to a counting circuit 56 which divides by a factor of 1,000 and thus provides output pulses having a spacing of 1,000 microseconds. The output of frequency divider 56 is applied to a divide-by-ten ring counter 58 which sequentially provides output pulses of 1 microsecond duration on each of its ten output lines. The tenth output of ring counter 58 is coupled to a divide-by-three ring counter 60 which sequentially provides sustained direct-current outputs on each of its three output lines. The first through eighth outputs of ring counter 58 are coupled to an OR circuit 66, the output of which is applied to an AND circuit 68. The ninth output of ring counter 58 is applied to an AND circuit 70. The first output of ring counter 60 is coupled to the other input of AND circuits 68 and 70. The output of AND circuit 68 drives a blocking oscillator 72 providing output pulses of 5 μs. duration, which constitutes one-half cycle of the 100 kc. input.

Blocking oscillator 72 is provided with an output transformer 24. One terminal of the secondary winding of transformer 24 is connected to the collectors of transistors 16 and 18; and the other terminal thereof is coupled through respective resistors 20 and 22 to the bases of transistors 16 and 18. The output of AND circuit 70 drives a divide-by-two flip-flop 74, the output of which is coupled to a relay winding 76 which synchronously actuates not only the armatures of switches 30 and 32 but also the armatures of two additional single-pole double-throw switches 26 and 28.

The second, fifth, and seventh outputs of ring counter 58 are coupled to an OR circuit 78, the output of which is applied through a 10 μs. delay network 82 to the setting input of a flip-flop 86. The fourth, sixth, and eighth outputs of ring counter 58 are applied to an OR circuit 80, the output of which is coupled through a 10 μs. delay network 84 to the resetting input of flip-flop 86. Flip-flop 86 provides respective outputs of opposite polarity, one of which is positive and the other of which is negative with respect to ground. The outputs of flip-flop 86 are coupled to the armatures of switches 26 and 28 which comprise a double-pole double-throw reversing switch. One contact of each of switches 26 and 28 is connected to the base of transistor 8; and the other contacts thereof are connected to the base of transistor 10.

Switches 40 and 48 are synchronously actuated by a chopper winding 62 which is driven by an alternating current source 64 of any convenient frequency ranging from 30 to 400 cycles per second.

In operation of our invention, it is assumed that the Loran transmitter operates with a basic repetition rate of 33 pulses per second and thus with a basic time interval of 30,000 μs. For the usual Loran-C transmissions, a group of eight pulses is transmitted from each station instead of a single pulse during each basic period. These eight pulses are transmitted with a time separation of 1,000 μs. which thus requires 8,000 μs. for the entire train of eight pulses. The pulses are further provided with phase coding in that various pulses are transmitted with positive polarity or phase while others are transmitted with a reversed phase or negative polarity. It is assumed that the polarities of the pulse phase coding are in a + + − − + − + − sequence.

With the switches 30–32 and 26–28 in the positions shown and with flip-flop 86 re-set to provide outputs of the polarities indicated, transistor 10 is rendered conductive and transistor 8 non-conductive. At a time 1,000 μs. prior to the reception of the first of the group of transmitted pulses, ring counter 58 provides its tenth output pulse which indexes ring counter 60 to provide its first output, thus enabling AND circuits 68 and 70. With transistor 10 conductive, the first pulse from low-level amplifier 4 is coupled with positive polarity through transformer 6 to high-level amplifier 12. Simultaneously, the first output from ring counter 58 is coupled through OR circuit 60 and AND circuit 68 to trigger blocking oscillator 72. This drives the bases of transistors 16 and 18 positive relative to their collectors. Transistors 16 and 18 comprise a dual emitter switch which is connected for inverted transistor action with the collectors acting as emitters and the emitters as collectors. These transistors 16 and 18 are thus rendered conductive for a 5 microsecond interval comprising one-half cycle of the carrier. If the phasing of the master clock oscillator 54 is correct, the average value of the alternating voltage component applied to the low-pass filter comprising components 34 and 36 will be zero.

The second pulse from low-level amplifier 4 will also be coupled with positive polarity through transformer 6; and the second output of ring counter 58 will be coupled through OR circuit 66 and AND circuit 68 again to synchronously trigger blocking oscillator 72. The second output of ring counter 58 is also coupled through OR circuit 78 to set flip-flop 86 after a delay of 10 μs. provided by network 82. It will be noted that the delay provided by network 82 is appreciably longer than the 5 μs. sampling period of blocking oscillator 72. This affords a time interval of 990 μs. for flip-flop 86 to stabilize with output polarities opposite from those indicated and thus render transistor 8 conductive and transistor 10 non-conductive in preparation for detection of the third pulse.

The third pulse from low-level amplifier 4 is of negative polarity but is reversed in phase in transformer 6 and thus applied with positive polarity to high-level amplifier 12. The third output of ring counter 58 is coupled through OR circuit 66 and AND circuit 68 synchronously to trigger blocking oscillator 72. The fourth pulse from low-level amplifier 4 is also of negative polarity but is reversed in phase in transformer 6 and applied with positive polarity to high-level amplifier 12 for synchronous detection by the fourth output of ring counter 58. The fourth output of ring counter 58 is also coupled through OR circuit 80 to re-set flip-flop 86 after a time delay of 10 μs. in preparation for the detection of the fifth pulse which is of positive polarity. Again the time delay provided by network 84 is appreciably greater than the sampling period of blocking oscillator 72.

It will be noted that the fifth output from ring counter 58 sets flip-flop 86 in preparation for the detection of the sixth pulse which is of negative polarity. The sixth output of ring counter 58 re-sets flip-flop 86 for detection of the seventh pulse which is of positive polarity. The seventh output of ring counter 58 sets flip-flop 86 for detection of the eighth pulse which is of negative polarity. The eighth output of ring counter 58 re-sets flip-flop 86 for detection of the first pulse of the succeeding group which is of positive polarity.

Thus, during the detection of the eight pulses of the first group, flip-flop 86 is successively set and re-set in accordance with the particular phase code of the transmitter, so that all eight pulses are applied with positive polarity to the high-level amplifier 12 irrespective of their polarity of transmission.

The ninth output from ring counter 48 is coupled through AND circuit 70 to the divide-by-two flip-flop 74 which energizes winding 76. The tenth output from ring counter 58 indexes ring counter 60 to provide its second output, thus removing the enabling signals from AND circuits 68 and 70. During the next twenty pulses from frequency divider 56, ring counter 60 provides its second and third outputs, so that no triggering pulses are coupled from ring counter 58 through AND circuits 68 and 70 to either blocking oscillator 72 or flip-flop 74. The total period between the transmission of the first pulse of each group is 30,000 μs. Flip-flop 74 is triggered at 9,000 μs. This affords a period of 21,000 μs. for relay winding 76 to move switches 30, 32, 26, and 28 to their alternate positions.

With switches 26 and 28 in the alternate position and with flip-flop 86 re-set to provide outputs of the polarities shown, transistor 8 is rendered conductive and transistor 10 non-conductive. The first pulse of the succeeding group from low-level amplifier 4 is of positive polarity but will be inverted in transformer 6 and applied with negative polarity to high-level amplifier 12. However, the simultaneous actuation of switches 30 and 32 to the alternate position will result in the application of a positive polarity output to low-pass filter resistor 34. The various pulses of the second group are again decoded by the successive setting and re-setting of flip-flop 86 to that all eight pulses of the second group are applied with negative polarity to the high-level amplifier 12.

The ninth output of ring counter 58 is coupled through AND circuit 70 to trigger divide-by-two flip-flop 74 which now de-energizes winding 76, permitting the switches 30, 32, 26, and 28 to return to the position shown, so that positive polarity signals will be applied to high-level amplifier 12 when the third group of eight pulses is detected.

If the dual emitter switch comprising transistors 16 and 18 has a slight off-set voltage, then this error will be applied with positive effect to low-pass filter 34–36 during detection of odd groups with switches 30 and 32 in the positions shown, but will be applied with negative effect during detection of even groups with switches 30 and 32 in their alternate positions. The frequency of alternation of flip-flop 74 is nearly 17 cycles per second so that the error due to off-set in the sampling gate comprising transistors 16 and 18 will integrate to zero if the time-constant of the low-pass filter comprising resistor 34 and capacitor 36 is large compared with the period of alternation of flip-flop 74.

Non-linear distortion in the high-level amplifier 12 will similarly produce a direct-current off-set voltage. This off-set voltage will be the same irrespective of the phasing of the signals applied to the high-level amplifier so long as their amplitudes are the same. However, all off-set -voltages will integrate to zero after each two groups of pulses are detected and switches 30, 32, 26, and 28 are operated through one full cycle.

Switch 40 chops the small direct-current error voltage across integrating capacitor 36 into a corresponding square-wave alternating current for drift-free amplification by the alternating current amplifier 44 and synchronous demodulation by switch 48. Preferably, switch 40 is of the make-before-break type; and resistor 38 is provided to prevent the short-circuiting of capacitor 36. The voltage across low-pass filter capacitor 52 is thus a drift-free amplified replica of the error voltage across capacitor 36. The voltage across capacitor 52 adjusts the frequency and hence the phase of oscillator 54 until the sampling of the input pulses is symmetrical about a particular zero-crossing of the 100 kc. carrier.

Figure 2:
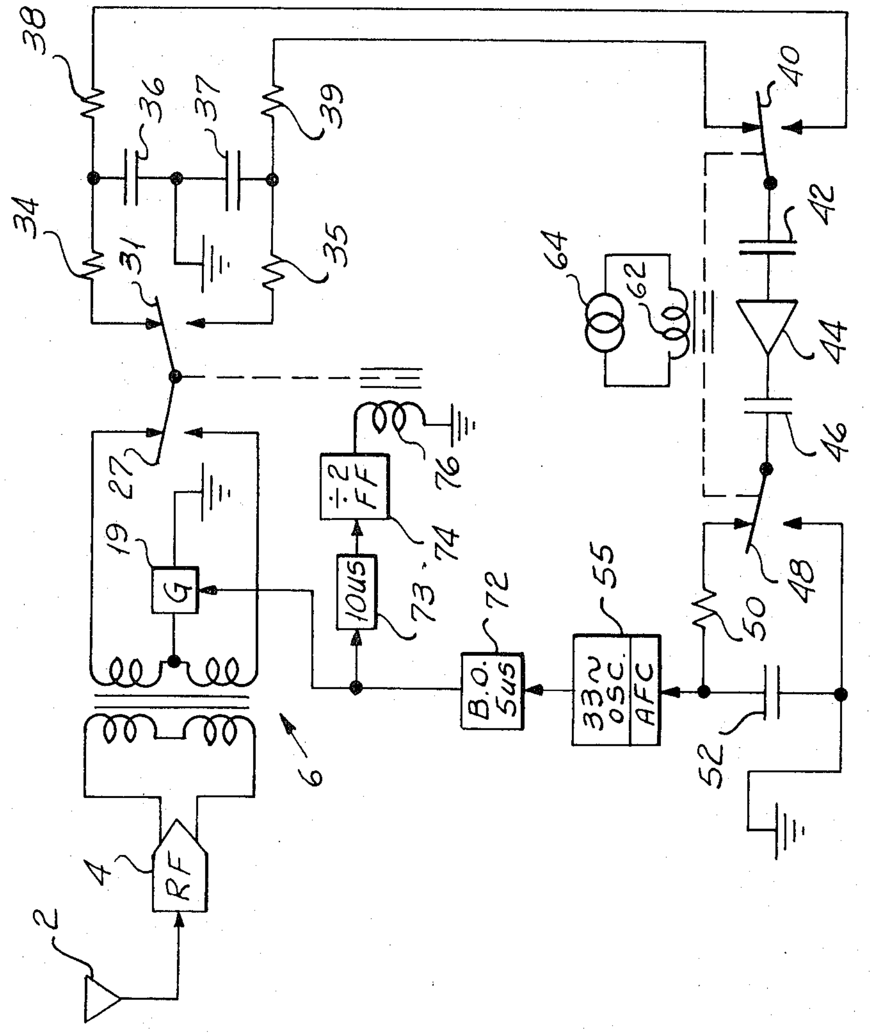
FIG. 2 is a schematic view showing another embodiment of our invention.

Referring now to FIG. 2, we have shown a simplified schematic view in which only one of the sequence of eight pulses is detected during each period. The output of low-level amplifier 4 is connected across the primary winding of transformer 6 which is provided with a secondary winding having a center tap coupled to ground through a gate 19. The terminals of the secondary winding are connected to the respective contacts of a single-pole double-throw switch 27. The armature of switch 27 is directly connected to the armature of a single-pole double-throw switch 31; and the high-level amplifier is omitted. The contacts of switch 31 are connected to respective low-pass filters comprising series resistors 34 and 35 and shunt capacitors 36 and 37. The ungrounded terminals of capacitors 36 and 37 are connected through respective resistors 38 and 39 to the contacts of chopper switch 40. The ungrounded terminal of the low-pass demodulating filter capacitor 52 is connected to the automatic frequency control of a 33 cycle oscillator 55. The output of blocking oscillator 72 actuates gate 19 and is further coupled through a 10 $\mu$s delay network 73 to the divide-by-two flip-flop 74. Relay winding 76 s ynchronously actuates the armatures of switches 27 and 31.

In operation of FIG. 2, the circuit again stabilizes with the blocking oscillator sampling one-half cycle of the input carrier symmetrically about a zero crossing. If the phase relations are in error, then an input will be applied to the frequency control of oscillator 55 to restore the proper phasing. Low-pass filter capacitor 36 integrates the normal polarity detector output with switches 27 and 31 in the positions show; and low-pass filter capacitor 37 integrates the reversed polarity detector output when switches 27 and 31 are actuated to their alternate positions.

Gate 19 may comprise a dual emitter switch as in FIG. 1. Off-set voltages in gate 19 will be applied with equal effect to capacitors 36 and 37 so that no differential voltage will exist between the contacts of chopper switch 40. Resistors 38 and 39 are provided to prevent the short-circuiting of capacitor 36 to capacitor 37, since switch 40 is preferably again of the make-before-break type.

The time-constants of the low-pass filters comprising components 34 through 37 need not be as large as the time-constant of the low-pass filter 34–36 of FIG. 1, since no alternating-current voltages proportional to off-set are applied to the filters. Furthermore, the frequency of alternation of switches 27 and 31 may be lower than in FIG. 1 for the same reasons.

Delay network 73 is provided to insure that flip-flop 74 is not actuated until 5 $\mu$s. subsequent to the trailing edge of the pulse from blocking oscillator 72. This affords a time interval of 32,990 $\mu$s. for relay winding 76 to move switches 27 and 31 to their alternate positions.

In both embodiments, distortion in amplifier 4 is not eliminated; however such distortion is negligible, since the amplifier is operated at a low level and consequently with excellent linearity. In FIG. 2, alternating-current amplifier 44 should have greater gain than in FIG. 1 to compensate for the absence of the high-level RF amplifier 12.

It will be seen that we have accomplished the objects of our invention. Our detector circuit simultaneously reverses both the polarities of the input to and the output of the synchronous detector at a rate approaching 17 cycles per second. This permits off-set voltages due to unbalance in the detector itself or to non-linear distortion in the high-level RF amplifier to integrate to zero. Our improved Loran detector circuit has extremely high stability and negligible drift.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A synchronous detector circuit for an alternating-current input signal including in combination a first phase reversible switching device, a second plurality reversible switching device, a gate, low-pass filtering means, means including the gate and the first switching device for coupling the input signal to the second switching device, means coupling the second switching device to the filtering means, a reference frequency source, means responsive to the reference source for periodically actuating the gate, and means responsive to the reference source for simultaneously operating both switching devices.

2. A detector circuit as in claim 1 in which the means coupling the input signal to the second switching device comprises means coupling the input signal to the first switching device and means including the gate for coupling the first switching device to the second switching device.

3. A detector circuit as in claim 1 in which the means coupling the input signal to the second switching device comprises means including the gate for coupling the input signal to the first switching device, and means connecting the first switching device to the second switching device.

4. A detector circuit as in claim 1 in which the first switching device comprises a pair of transistors.

5. A detector circuit as in claim 1 in which the second switching device comprises a double-pole double-throw reversing switch.

6. A detector circuit as in claim 1 in which the second switching device comprises a single-pole double-throw switch and in which the filtering means comprises a pair of low-pass filters.

7. A detector circuit as in claim 1 for a phase-coded Loran-C receiver which further includes means responsive to the reference source for operating the first switching device in accordance with a predetermined code independently of the second switching device.

8. A detector circuit as in claim 1 which further includes means responsive to the filtering means for controlling the frequency of the reference source.

References Cited

UNITED STATES PATENTS

| | | | |
|---|---|---|---|
| Re. 26,210 | 5/1967 | Russell | 329—103 |
| 3,399,352 | 8/1968 | Dalton | 329—50 X |
| 3,403,345 | 9/1968 | Frank et al. | 329—50 X |

JOHN KOMINSKI, Primary Examiner

L. J. DAHL, Assistant Examiner

U.S. Cl. X.R.

329—103, 104